(12) United States Patent
Qu et al.

(10) Patent No.: US 11,723,003 B2
(45) Date of Patent: *Aug. 8, 2023

(54) LATENCY REDUCTION FOR ARTIFICIAL REALITY

(71) Applicant: Meta Platforms Technologies, LLC, Menlo Park, CA (US)

(72) Inventors: Qi Qu, Redmond, WA (US); Dong Zheng, Saratoga, CA (US); Gang Lu, Pleasanton, CA (US); William Louis Abbott, Portola Valley, CA (US); Nicholas Daniel Trail, Bothell, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/878,445

(22) Filed: Aug. 1, 2022

(65) Prior Publication Data

US 2022/0369313 A1  Nov. 17, 2022

Related U.S. Application Data

(63) Continuation of application No. 16/774,863, filed on Jan. 28, 2020, now Pat. No. 11,405,913.
(Continued)

(51) Int. Cl.
*H04W 72/0446* (2023.01)
*G06F 3/01* (2006.01)
(Continued)

(52) U.S. Cl.
CPC ........ *H04W 72/0446* (2013.01); *G06F 3/012* (2013.01); *G06F 3/013* (2013.01);
(Continued)

(58) Field of Classification Search
CPC ........... H04L 1/0011; H04L 5/0044; H04W 72/0446; H04W 76/30; G06F 3/012;
(Continued)

(56) References Cited

U.S. PATENT DOCUMENTS

| 2013/0254798 | A1* | 9/2013 | Kim | H04N 21/4348 725/32 |
| 2017/0084084 | A1* | 3/2017 | Durham | G06F 3/04842 |

(Continued)

FOREIGN PATENT DOCUMENTS

| WO | 2017031385 A1 | 2/2017 |
| WO | WO-2017031385 A1 * | 2/2017 ........... G06T 19/003 |

OTHER PUBLICATIONS

International Search Report and Written Opinion for International Application No. PCT/US2020/021118, dated Jul. 15, 2020, 10 Pages.

*Primary Examiner* — Rina C Pancholi
(74) *Attorney, Agent, or Firm* — Foley & Lardner LLP

(57) ABSTRACT

Disclosed herein are related to a system and a method of remotely rendering artificial reality. In one approach, a console determines an expected transmission end time of a first session for wireless transmission of image data indicating an image of artificial reality to a head wearable display. In one approach, the console determines an expected process end time of generating additional data associated with the image of the artificial reality. In one approach, the console compares the expected transmission end time and the expected process end time. The console may transmit, to the head wearable display in the first session, the additional data together with the image data, in response to the expected process end time being less than the expected transmission end time.

20 Claims, 7 Drawing Sheets

Related U.S. Application Data

(60) Provisional application No. 62/815,811, filed on Mar. 8, 2019.

(51) Int. Cl.
  *G06F 3/14*   (2006.01)
  *H04L 1/00*   (2006.01)
  *H04L 5/00*   (2006.01)
  H04W 76/30   (2018.01)

(52) U.S. Cl.
  CPC .............. *G06F 3/14* (2013.01); *H04L 1/0011* (2013.01); *H04L 5/0044* (2013.01); *H04W 76/30* (2018.02)

(58) Field of Classification Search
  CPC . G06F 3/013; G06F 3/14; G06F 3/011; G02B 2027/014; G02B 27/0093
  See application file for complete search history.

(56) References Cited

U.S. PATENT DOCUMENTS

| | | | |
|---|---|---|---|
| 2017/0289615 A1* | 10/2017 | Kobayashi | H04N 21/242 |
| 2018/0253897 A1* | 9/2018 | Satake | A63F 13/215 |
| 2019/0333263 A1* | 10/2019 | Melkote Krishnaprasad | G06F 3/011 |
| 2020/0288492 A1* | 9/2020 | Lu | H04W 72/1263 |

* cited by examiner

LATENCY REDUCTION FOR ARTIFICIAL REALITY

CROSS-REFERENCE TO RELATED APPLICATIONS

This application is a continuation application of U.S. patent application Ser. No. 16/774,863, filed Jan. 28, 2020, which claims priority to U.S. Provisional Patent Application No. 62/815,811, filed Mar. 8, 2019, all of which are incorporated by references in their entireties for all purposes.

FIELD OF DISCLOSURE

The present disclosure is generally related to communication for rendering artificial reality, including but not limited to reducing latency in communication for artificial reality.

BACKGROUND

Artificial reality such as a virtual reality (VR), an augmented reality (AR), or a mixed reality (MR) provides immersive experience to a user. In one example, a user wearing a head wearable display (HWD) can turn the user's head, and an image of a virtual object corresponding to a location of the HWD and a gaze direction of the user can be displayed on the HWD to allow the user to feel as if the user is moving within a space of artificial reality (e.g., a VR space, an AR space, or a MR space).

In one implementation, an image of a virtual object is generated by a console communicatively coupled to the HWD. In one example, the HWD includes various sensors that detect a location and/or orientation of the HWD, and transmits the detected location and/or orientation of the HWD to the console through a wired connection or a wireless connection. The console can determine a user's view of the space of the artificial reality according to the detected location and/or orientation of the HWD, and generate image data indicating an image of the space of the artificial reality corresponding to the user's view. The console can transmit the image data to the HWD, by which the image of the space of the artificial reality corresponding to the user's view can be presented to the user. In one aspect, the process of detecting the location of the HWD and the gaze direction of the user wearing the HWD, and rendering the image to the user should be performed within a frame time (e.g., less than 11 ms). Any latency between a movement of the user wearing the HWD and an image displayed corresponding to the user movement can cause judder, which may result in motion sickness and can degrade the user experience.

SUMMARY

Various embodiments disclosed herein are related to a method of communicating data for rendering artificial reality. In some embodiments, the method includes determining, by a console, an expected transmission end time of a first session for wireless transmission of image data indicating an image of artificial reality to a head wearable display. In some embodiments, the method includes determining, by the console, an expected process end time of generating additional data associated with the image of the artificial reality. In some embodiments, the method includes comparing, by the console, the expected transmission end time and the expected process end time. In some embodiments, the method includes transmitting, by the console to the head wearable display in the first session, the additional data together with the image data, in response to the expected process end time being less than the expected transmission end time.

In some embodiments, the method includes receiving, by the console from the head wearable display, information indicating a location and an orientation of the head wearable display. In some embodiments, the method includes generating, by the console, the image data indicating the image of the artificial reality according to the received information. In some embodiments, the method includes generating, by the console, the additional data associated with the image of the artificial reality. In some embodiments, the method includes transmitting, by the console to the head wearable display in a same transmit opportunity window or system interval, the additional data together with the image data, in response to the expected process end time being less than the expected transmission end time.

In some embodiments, the method includes extending, by the console according to the expected process end time, the first session, in response to the expected process end time being larger than the expected transmission end time, and transmitting, by the console to the head wearable display in the extended first session, the additional data together with the image data. In some embodiments, extending, by the console according to the expected process end time, the first session includes adjusting, by the console, a modulation and coding scheme of the first session to extend the first session.

In some embodiments, the method includes transmitting, by the console to the head wearable display in the first session, timing information indicating the expected process end time, in response to the expected process end time being larger than the expected transmission end time, and transmitting, by the console to the head wearable display through a second session after the first session, the additional data, in response to the expected process end time being larger than the expected transmission end time. In some embodiments, the head wearable display is configured to disable wireless communication with the console between the first session and the second session.

In some embodiments, the method includes selecting, by the console, one or more processes to generate a subset of the additional data, in response to the expected process end time being larger than the expected transmission end time, performing, by the console, the selected one or more processes to generate the subset of the additional data, and transmitting, by the console to the head wearable display in the first session, the subset of the additional data together with the image data. In some embodiments, the subset of the additional data includes at least: mapping information for translating a location and an orientation of the head wearable display in a physical space into a virtual space, hand model data indicating a shape, a location, or an orientation of a hand of a user of the head wearable display, or eye tracking data indicating a gaze direction of the user of the head wearable display.

Various embodiments disclosed herein are related to a system of communicating data for rendering artificial reality. In some embodiments, the system includes a wireless communication interface. In some embodiments, the system includes a processor configured to determine an expected transmission end time of a first session for wireless transmission of image data indicating an image of artificial reality to a head wearable display, determine an expected process end time of generating additional data associated with the image of the artificial reality, compare the expected transmission end time and the expected process end time, and configure the wireless communication interface to transmit, to the head wearable display in the first session, the additional data together with the image data, in response to the expected process end time being less than the expected transmission end time.

In some embodiments, the processor is further configured to configure the wireless communication interface to receive, from the head wearable display, information indicating a location and an orientation of the head wearable display, generate the image data indicating the image of the artificial reality according to the received information, and generate the additional data associated with the image of the artificial reality. In some embodiments, the processor is further configured to configure the wireless communication interface to transmit, to the head wearable display in a same transmit opportunity window or system interval, the additional data together with the image data, in response to the expected process end time being less than the expected transmission end time.

In some embodiments, the processor is further configured to extend, according to the expected process end time, the first session, in response to the expected process end time being larger than the expected transmission end time, and configure the wireless communication interface to transmit, to the head wearable display in the extended first session, the additional data together with the image data. In some embodiments, the processor is configured to extend, according to the expected process end time, the first session by adjusting a modulation and coding scheme of the first session to extend the first session.

In some embodiments, the processor is further configured to configure the wireless communication interface to transmit, to the head wearable display in the first session, timing information indicating the expected process end time, in response to the expected process end time being larger than the expected transmission end time, and configure the wireless communication interface to transmit, to the head wearable display through a second session after the first session, the additional data, in response to the expected process end time being larger than the expected transmission end time. In some embodiments, the head wearable display is configured to disable wireless communication with the wireless communication interface between the first session and the second session.

In some embodiments, the processor is further configured to select one or more processes to generate a subset of the additional data, in response to the expected process end time being larger than the expected transmission end time, perform the selected one or more processes to generate the subset of the additional data, and configure the wireless communication interface to transmit, to the head wearable display in the first session, the subset of the additional data together with the image data. In some embodiments, the subset of the additional data includes at least: mapping information for translating a location and an orientation of the head wearable display in a physical space into a virtual space, hand model data indicating a shape, a location, or an orientation of a hand of a user of the head wearable display, or eye tracking data indicating a gaze direction of the user of the head wearable display.

Various embodiments disclosed herein are related to a head wearable display. In some embodiments, the head wearable display includes a wireless communication interface and a processor. In some embodiments, the processor configures the wireless communication interface to receive, from a console in a first session, image data indicating an image of artificial reality and timing information indicating an expected process end time for the console to generate additional data associated with the image of the artificial reality. In some embodiments, the processor is configures the wireless communication interface in a sleep mode until the expected process end time. In some embodiments, the processor configures the wireless communication interface to receive, from the console, in a second session after the expected process end time, the additional data. In some embodiments, the processor presents the artificial reality according to the image of the artificial reality and the additional data. In some embodiments, the additional data includes mapping information for translating a location and an orientation of the head wearable display in a physical space into a virtual space.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1:
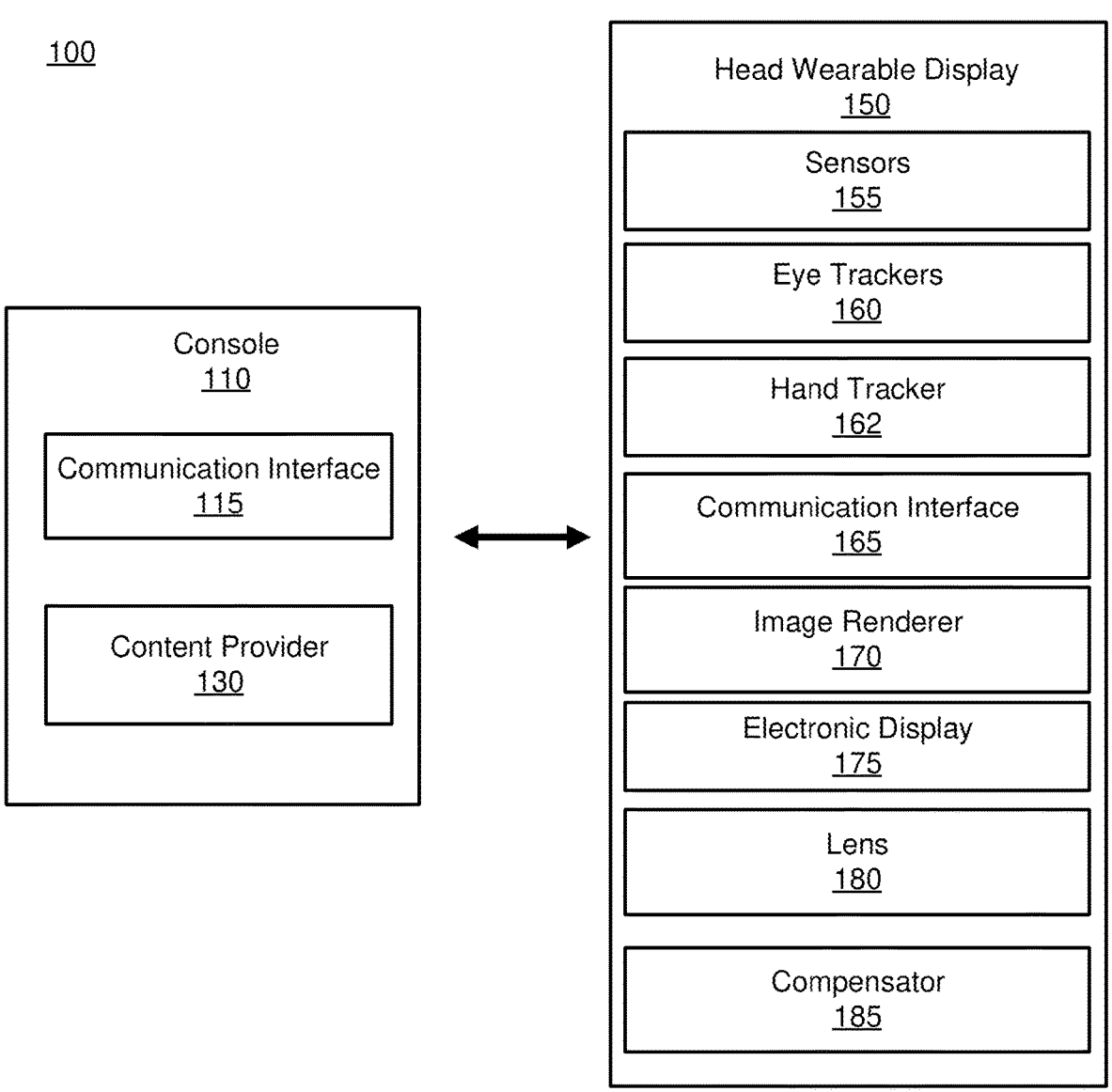
FIG. 1 is a diagram of a system environment including an artificial reality system, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are related to systems and methods for remotely rendering an artificial reality space (e.g., an AR space, a VR space, or a MR space) by transmitting additional data of artificial reality from a console device to a head wearable display (HWD) with reduce latency. Additional data may be information associated with presenting or rendering artificial reality other than an image of the artificial reality. Additional data may include object information, depth information, hand model data, feedback information, etc. In some embodiments, the console transmits image data indicating an image of the artificial reality in one or more allocated sessions. For example, the console may transmit a portion of the image data or the entire image data of the artificial reality in a session, then may disable communication with the HWD until a subsequent session to transmit the computed sensor data. In one aspect, disabling communication between two sessions can conserve power consumption of the console and the HWD. In some embodiments, additional data associated with presenting or rendering artificial reality other than the image data of the artificial reality may not be ready for transmission in a session for the image data, and may be transmitted in a subsequent session for subsequent image data, thereby causing delay in transmission of the additional data. However, the delay in transmission of the additional data may cause latency from detecting a movement of a user of the HWD, and presenting the artificial reality corresponding to the detected movement. Such latency may cause judder and degrade a user experience in the artificial reality. In one aspect, to reduce the latency in presenting the artificial reality, the console may adaptively transmit the additional data through various approaches disclosed herein.

In one approach, the console may transmit additional data associated with image data indicating an image of the artificial reality in the session for the image data, in case the session (e.g., a transmission opportunity (TX OP) window, and/or a current system interval) is capable or suitable for the transmission of the additional data. For example, the console may determine whether the additional data can be transmitted before an end of the session for the image data. If the additional data associated with the image data can be transmitted before an end of the session for the image data, the console may transmit, to the HWD, the additional data together with the image data in the session.

In one approach, in case the session is incapable or unsuitable for the transmission of the additional data, the console may adjust the session, adjust the additional data, or both. In one example, the console may extend the session, and may transmit the additional data in the extended session. In one example, the console may select a subset of the additional data, according to priorities or rankings of different subsets of the additional data, and transmit the selected subset of the additional data in the session. The console may omit or bypass transmission of the other subset of the additional data, or may transmit the other subset of the additional data in a subsequent session.

In one approach, in case the session is incapable or unsuitable for the transmission of the additional data, the console can transmit the additional data between (e.g., in one or both of) the session for the image and the subsequent session for the subsequent image. For example, the console can transmit, to the HWD, timing information indicating expected time for transmission of the additional data. The console may transmit the timing information (which may correspond to a portion of the additional data) to the HWD in the session. After the session and before the expected time, communication between the console and the HWD may be disabled. At or after the expected time, communication between the console and the HWD can be enabled according to the timing information, and the console can transmit some or all of the additional data to the HWD.

FIG. 1 is a block diagram of an example artificial reality system environment 100. In some embodiments, the artificial reality system environment 100 includes a HWD 150 worn by a user, and a console 110 providing content of artificial reality to the HWD 150. The HWD 150 may be referred to as, include, or be part of a head mounted display (HWD), head mounted device (HMD), head wearable device (HWD), head worn display (HWD) or head worn device (HWD). The HWD 150 may detect its location and/or orientation of the HWD 150 as well as a shape, location, and/or an orientation of the body/hand/face of the user, and provide the detected location/or orientation of the HWD 150 and/or tracking information indicating the shape, location, and/or orientation of the body/hand/face to the console 110. The console 110 may generate image data indicating an image of the artificial reality according to the detected location and/or orientation of the HDM 150, the detected shape, location and/or orientation of the body/hand/face of the user, and/or a user input for the artificial reality, and transmit the image data to the HWD 150 for presentation. In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the console 110 may be performed by the HWD 150. For example, some of the functionality of the HWD 150 may be performed by the console 110. In some embodiments, the console 110 is integrated as part of the HWD 150.

In some embodiments, the HWD 150 is an electronic component that can be worn by a user and can present or provide an artificial reality experience to the user. The HWD 150 may render one or more images, video, audio, or some combination thereof to provide the artificial reality experience to the user. In some embodiments, audio is presented via an external device (e.g., speakers and/or headphones) that receives audio information from the HWD 150, the console 110, or both, and presents audio based on the audio information. In some embodiments, the HWD 150 includes sensors 155, eye trackers 160, a hand tracker 162, a communication interface 165, an image renderer 170, an electronic display 175, a lens 180, and a compensator 185. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detect a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the eye trackers 160 include electronic components or a combination of electronic components and software components that determine a gaze direction of the user of the HWD 150. In some embodiments, the HWD 150, the console 110 or a combination of them may incorporate the gaze direction of the user of the HWD 150 to generate image data for artificial reality. In some embodiments, the eye trackers 160 include two eye trackers, where each eye tracker 160 captures an image of a corresponding eye and determines a gaze direction of the eye. In one example, the eye tracker 160 determines an angular rotation of the eye, a translation of the eye, a change in the torsion of the eye, and/or a change in shape of the eye, according to the captured image of the eye, and determines the relative gaze direction with respect to the HWD 150, according to the determined angular rotation, translation and the change in the torsion of the eye. In one approach, the eye tracker 160 may shine or project a predetermined reference or structured pattern on a portion of the eye, and capture an image of the eye to analyze the pattern projected on the portion of the eye to determine a relative gaze direction of the eye with respect to the HWD 150. In some embodiments, the eye trackers 160 incorporate the orientation of the HWD 150 and the relative gaze direction with respect to the HWD 150 to determine a gate direction of the user. Assuming for an example that the HWD 150 is oriented at a direction 30 degrees from a reference direction, and the relative gaze direction of the HWD 150 is −10 degrees (or 350 degrees) with respect to the HWD 150, the eye trackers 160 may determine that the gaze direction of the user is 20 degrees from the reference direction. In some embodiments, a user of the HWD 150 can configure the HWD 150 (e.g., via user settings) to enable or disable the eye trackers 160. In some embodiments, a user of the HWD 150 is prompted to enable or disable the eye trackers 160.

In some embodiments, the hand tracker 162 includes an electronic component or a combination of an electronic component and a software component that tracks a hand of the user. In some embodiments, the hand tracker 162 includes or is coupled to an imaging sensor (e.g., camera) and an image processor that can detect a shape, a location and an orientation of the hand. The hand tracker 162 may generate hand tracking measurements indicating the detected shape, location and orientation of the hand.

In some embodiments, the communication interface 165 includes an electronic component or a combination of an electronic component and a software component that communicates with the console 110. The communication interface 165 may communicate with a communication interface 115 of the console 110 through a communication link. The communication link may be a wireless link. Examples of the wireless link can include a cellular communication link, a near field communication link, Wi-Fi, Bluetooth, 60 GHz wireless link, or any communication wireless communication link. Through the communication link, the communication interface 165 may transmit to the console 110 data indicating the determined location and/or orientation of the HWD 150, the determined gaze direction of the user, and/or hand tracking measurement. Moreover, through the communication link, the communication interface 165 may receive from the console 110 image data indicating or corresponding to an image to be rendered and additional data associated with the image.

In some embodiments, the image renderer 170 includes an electronic component or a combination of an electronic component and a software component that generates one or more images for display, for example, according to a change in view of the space of the artificial reality. In some embodiments, the image renderer 170 is implemented as a processor (or a graphical processing unit (GPU)) that executes instructions to perform various functions described herein. The image renderer 170 may receive, through the communication interface 165, image data describing an image of artificial reality to be rendered and additional data associated with the image, and render the image through the electronic display 175. In some embodiments, the image data from the console 110 may be encoded, and the image renderer 170 may decode the image data to render the image. In some embodiments, the image renderer 170 receives, from the console 110 in additional data, object information indicating virtual objects in the artificial reality space and depth information indicating depth (or distances from the HWD 150) of the virtual objects. In one aspect, according to the image of the artificial reality, object information, depth information from the console 110, and/or updated sensor measurements from the sensors 155, the image renderer 170 may perform shading, reprojection, and/or blending to update the image of the artificial reality to correspond to the updated location and/or orientation of the HWD 150. Assuming that a user rotated his head after the initial sensor measurements, rather than recreating the entire image responsive to the updated sensor measurements, the image renderer 170 may generate a small portion (e.g., 10%) of an image corresponding to an updated view within the artificial reality according to the updated sensor measurements, and append the portion to the image in the image data from the console 110 through reprojection. The image renderer 170 may perform shading and/or blending on the appended edges. Hence, without recreating the image of the artificial reality according to the updated sensor measurements, the image renderer 170 can generate the image of the artificial reality. In some embodiments, the image renderer 170 receives hand model data indicating a shape, a location and an orientation of a hand model corresponding to the hand of the user, and overlay the hand model on the image of the artificial reality. Such hand model may be presented as a visual feedback to allow a user to provide various interactions within the artificial reality.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HWD 150 is worn by a user, the electronic display 175 is located proximate (e.g., less than 3 inches) to the user's eyes. In one aspect, the electronic display 175 emits or projects light towards the user's eyes according to image generated by the image renderer 170.

In some embodiments, the lens 180 is a mechanical component that alters received light from the electronic display 175. The lens 180 may magnify the light from the electronic display 175, and correct for optical error associated with the light. The lens 180 may be a Fresnel lens, a convex lens, a concave lens, a filter, or any suitable optical component that alters the light from the electronic display 175. Through the lens 180, light from the electronic display 175 can reach the pupils, such that the user can see the image displayed by the electronic display 175, despite the close proximity of the electronic display 175 to the eyes.

In some embodiments, the compensator 185 includes an electronic component or a combination of an electronic component and a software component that performs compensation to compensate for any distortions or aberrations. In one aspect, the lens 180 introduces optical aberrations such as a chromatic aberration, a pin-cushion distortion, barrel distortion, etc. The compensator 185 may determine a compensation (e.g., predistortion) to apply to the image to be rendered from the image renderer 170 to compensate for the distortions caused by the lens 180, and apply the determined compensation to the image from the image renderer 170. The compensator 185 may provide the predistorted image to the electronic display 175.

In some embodiments, the console 110 is an electronic component or a combination of an electronic component and a software component that provides content to be rendered to the HWD 150. In one aspect, the console 110 includes a communication interface 115 and a content provider 130. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. In addition, these components may operate together to generate additional data associated with the image. Additional data may be information associated with presenting or rendering the artificial reality other than the image of the artificial reality. Examples of additional data include, hand model data, mapping information for translating a location and an orientation of the HWD 150 in a physical space into a virtual space (or simultaneous localization and mapping (SLAM) data), eye tracking data, motion vector information, depth information, edge information, object information, etc. The console 110 may provide the image data and the additional data to the HWD 150 for presentation of the artificial reality. In other embodiments, the console 110 includes more, fewer, or different components than shown in FIG. 1. In some embodiments, the console 110 is integrated as part of the HWD 150.

In some embodiments, the communication interface 115 is an electronic component or a combination of an electronic component and a software component that communicates with the HWD 150. The communication interface 115 may be a counterpart component to the communication interface 165 to communicate with a communication interface 115 of the console 110 through a communication link (e.g., wireless link). Through the communication link, the communication interface 115 may receive from the HWD 150 data indicating the determined location and/or orientation of the HWD 150, the determined gaze direction of the user, and the hand tracking measurement. Moreover, through the communication link, the communication interface 115 may transmit to the HWD 150 image data describing an image to be rendered and additional data associated with the image of the artificial reality.

The content provider 130 can include or correspond to a component that generates content to be rendered according to the location and/or orientation of the HWD 150. In some embodiments, the content provider 130 may incorporate the gaze direction of the user of the HWD 150, and a user interaction in the artificial reality based on hand tracking measurements to generate the content to be rendered. In one aspect, the content provider 130 determines a view of the artificial reality according to the location and/or orientation of the HWD 150. For example, the content provider 130 maps the location of the HWD 150 in a physical space to a location within an artificial reality space, and determines a view of the artificial reality space along a direction corresponding to the mapped orientation from the mapped location in the artificial reality space. The content provider 130 may generate image data describing an image of the determined view of the artificial reality space, and transmit the image data to the HWD 150 through the communication interface 115. The content provider 130 may also generate a hand model corresponding to a hand of a user of the HWD 150 according to the hand tracking measurement, and generate hand model data indicating a shape, a location, and an orientation of the hand model in the artificial reality space. In some embodiments, the content provider 130 may generate additional data including motion vector information, depth information, edge information, object information, hand model data, etc., associated with the image, and transmit the additional data together with the image data to the HWD 150 through the communication interface 115. The content provider 130 may encode the image data describing the image, and can transmit the encoded data to the HWD 150. In some embodiments, the content provider 130 generates and provides the image data to the HWD 150 periodically (e.g., every 11 ms). In one aspect, the communication interface 115 can adaptively transmit the additional data to the HWD 150 as described below with respect to FIGS. 3 through 6.

Figure 2:
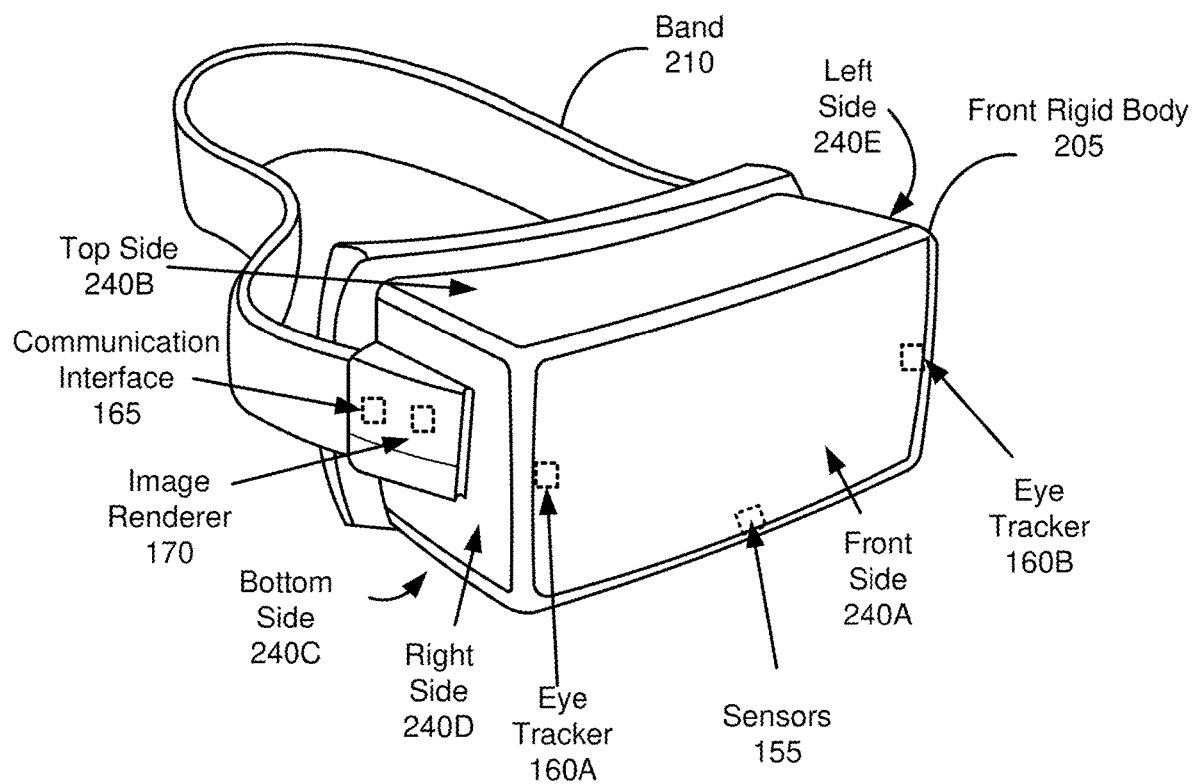
FIG. 2 is a diagram of a head wearable display, according to an example implementation of the present disclosure.

FIG. 2 is a diagram of a HWD 150, in accordance with an example embodiment. In some embodiments, the HWD 150 includes a front rigid body 205 and a band 210. The front rigid body 205 includes the electronic display 175 (not shown in FIG. 2), the lens 180 (not shown in FIG. 2), the sensors 155, the eye trackers 160A, 160B, the communication interface 165, and the image renderer 170. In the embodiment shown by FIG. 2, the communication interface 165, the image renderer 170, and the sensors 155 are located within the front rigid body 205, and may not visible to the user. In other embodiments, the HWD 150 has a different configuration than shown in FIG. 2. For example, the communication interface 165, the image renderer 170, the eye trackers 160A, 160B, and/or the sensors 155 may be in different locations than shown in FIG. 2.

Figure 3:
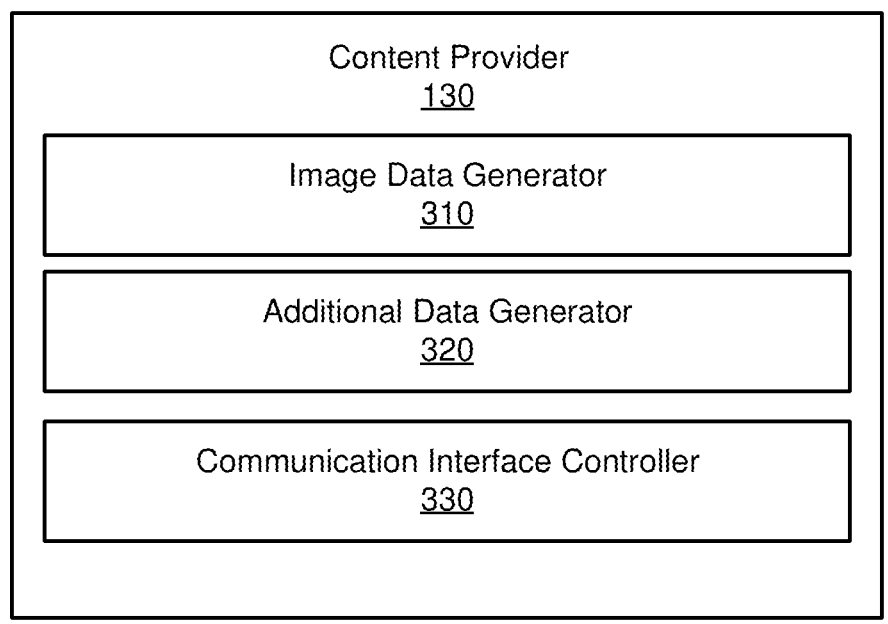
FIG. 3 is a diagram of a content provider, according to an example implementation of the present disclosure.

FIG. 3 is a diagram of the content provider 130, according to an example implementation of the present disclosure. In some embodiments, the content provider 130 includes an image data generator 310, an additional data generator 320, and a communication interface controller 330. These components may operate together to generate image data indicating an image of a view of an artificial reality and additional data associated with the image data of the artificial reality, and transmit the image and the additional data to the HWD 150. In some embodiments, the content provider 130 includes more, fewer, or different components than shown in FIG. 3. In some embodiments, functionalities of some components of the content provider 130 can be performed by the HWD 150.

In some embodiments, the image data generator 310 corresponds to or includes a hardware component (e.g., processor, circuitry), a software component, or a combination of hardware component and software component that generates image data indicating an image of artificial reality according to sensor measurements from the HWD 150. In one approach, the image data generator 310 maps a location and/or an orientation in an artificial reality space corresponding to the location and/or the orientation of the HWD 150 in a physical space. The image data generator 310 then may determine a view of the artificial reality space from the mapped location in the artificial reality space according to the mapped orientation in the artificial reality space. The image data generator 310 may generate image data indicating an image of the determined view of the artificial reality space. For example, if the sensor measurements indicate that the user of the HWD 150 has rotated his head 90 degrees in a clockwise direction, the image data generator 310 may generate an image corresponding to 90 degrees clockwise rotation within the artificial reality space.

In some embodiments, the additional data generator 320 corresponds to or includes a hardware component (e.g., processor), a software component, or a combination of hardware component and software component that generates additional data according to sensor measurements from the HWD 150. Additional data may be information associated with presenting or rendering artificial reality other than an image of the artificial reality. Additional data may include object information, depth information, hand model data, etc. The object information may indicate interactive virtual objects, or non-interactive virtual objects within the artificial reality, and depth information may indicate depth or distances of the virtual objects relative to the user or the HWD within the artificial reality. The additional data generator 320 may generate object information and depth information of virtual objects in the artificial reality space, according to the mapped location and orientation in the artificial reality space. The additional data generator 320 may also generate hand model data indicating a shape, a location and an orientation of a virtual hand model according to the hand tracking measurements indicating the detected shape, location and orientation of the hand from the HWD 150. In addition, the additional data generator 320 may generate mapping information for mapping or translating a location and an orientation of the HWD 150 in a physical space into the artificial reality space. In addition, the additional data generator 320 may generate hand tracking data indicating a position, orientation and/or direction of the user of the HWD 150.

In some embodiments, the communication interface controller 330 corresponds to or includes a component that configures the communication interface 115. In one aspect, the communication interface controller 330 configures the communication interface 115 to communicate with the HWD 150 in one or more sessions. One or more sessions may be predetermined, and may be adjustable by the communication interface controller 330. In one example, the communication interface controller 330 configures the communication interface 115 to receive data indicating sensor measurements of the detected location and the orientation of the HWD 150 and/or the gaze direction of the user. In one example, the communication interface controller 330 configures the communication interface 115 to transmit image data indicating an image of the artificial reality. Between sessions, the communication interface controller 330 may configure the communication interface 115 to operate or reside in a sleep mode, and disable communication with the HWD 150. By disabling communication between the HWD 150 and the console 110, the console 110 and the HWD 150 may reduce power consumption. However, enabling and disabling the communication interface 115 may delay transmission of additional data, which may delay presentation of the artificial reality to the user by the HWD 150 and degrade the user experience. In one aspect, the communication interface controller 330 configures the communication interface 115 to adaptively transmit additional data to reduce latency of presentation of artificial reality and provide seamless experience to the user of the HWD 150.

In one approach, the communication interface controller 330 determines whether a session for transmission of image data is suitable or capable of transmission of additional data. In some embodiments, the communication interface controller 330 estimates, projects, calculates, determines and/or obtains an expected transmission end time ($T_{UL}$) and an expected process end time ($T_{EST}$), and determines whether the session is suitable or capable of transmission of the additional data by comparing the expected transmission end time $T_{UL}$ and expected process end time $T_{EST}$. In one aspect, an expected transmission end time $T_{UL}$ is an expected time to complete a session (e.g., data transfer or transmission session) for wireless transmission of image data indicating an image of artificial reality to the HWD 150. The communication interface controller 330 may determine the expected transmission end time ($T_{UL}$) according to a size or an amount of the image data (e.g., available or generated at/by a certain time instance for example) and a data rate (e.g., average or instantaneous data rate, at the certain time instance for example) of a wireless channel. In one aspect, an expected process end time $T_{EST}$ is an expected time for the additional data generator 320 to complete generating (e.g., collecting, calculating, forming) additional data associated with the image of the artificial reality. The communication interface controller 330 may determine the expected process end time $T_{EST}$ according to a number of processes to generate the additional data, and a number of available processors or resources to execute the processes to generate the additional data. For example, the communication interface controller 330 may determine an amount of time for the available processors of the additional data generator 320 to execute the processes to generate the additional data If the expected transmission end time ($T_{UL}$) is larger than the expected process end time ($T_{EST}$), then the communication interface controller 330 may determine that the session is suitable or capable of transmission of the additional data. If the expected transmission end time ($T_{UL}$) is less than the expected process end time ($T_{EST}$), then the communication interface controller 330 may determine that the session is unsuitable or incapable of transmission of the additional data (e.g., the session is too short in duration or is already communicating too much image data, to communicate the additional data within a same system interval).

In one approach, in case the session is capable or suitable for the transmission of the additional data, the communication interface controller 330 may configure the communication interface 115 to transmit the image data and the additional data in the session. In one example, the communication interface controller 330 may configure the communication interface 115 to transmit the image data, and after transmission of the image data and before the expected transmission end time $T_{UL}$, configure the communication interface 115 to transmit the additional data.

In one approach, in case the session is incapable or unsuitable for the transmission of the additional data, the communication interface controller 330 may adjust the session. In one aspect, the communication interface controller 330 extends the session to increase the expected transmission end time $T_{UL}$, and configure the communication interface 115 to transmit the additional data in the extended session. For example, if the expected transmission end time $T_{UL}$ is less than the expected process end time $T_{EST}$, the communication interface controller 330 may adjust a modulation and coding scheme to reduce a data rate or bandwidth to extend the expected transmission end time $T_{UL}$. Assuming for an example that the expected process end time $T_{EST}$ is 5 ms and the expected transmission end time $T_{UL}$ based on the initial MCS selection with 1 Gbps data rate is 1 ms, the communication interface controller 330 may adjust the MCS selection to 200 Mbps, such that the extended expected transmission end time $T_{UL}$ can be 5 ms. In one example, the communication interface controller 330 may configure the communication interface 115 to transmit the image data and the additional data in the adjusted session with the extended transmission end time $T_{UL}$.

In one approach, in case the session for the image data is incapable or unsuitable for the transmission of the additional data, the communication interface controller 330 may adjust the additional data for transmission. In one aspect, the communication interface controller 330 may select a subset of the additional data, according to priorities or rankings of different subsets of the additional data, and configure the communication interface 115 to transmit the selected subset of the additional data in the session. For example, the communication interface controller 330 may select the SLAM data or the hand model data associated with image of the artificial reality over other data associated with the image. The communication interface controller 330 may configure the communication interface 115 to omit or bypass transmission of the other subset of the additional data. Alternatively, the communication interface controller 330 may configure the communication interface 115 to transmit the other subset of the additional data in a subsequent session. In some embodiments, the communication interface controller 330 may configure the additional data generator 320 to omit or bypass one or more processes for generating the other subset of the additional data, such that the additional data generator 320 may prioritize one or more processes for generating the selected subset of the additional data. Accordingly, the expected process end time $T_{EST}$ can be reduced, and the communication interface controller 330 may configure the communication interface 115 to transmit the image data and the selected subset of the additional data in the (same) session (e.g., within a same transmit opportunity (TX OP) window and/or system interval).

In one approach, in case the session is incapable or unsuitable for the transmission of the additional data, the communication interface controller 330 can configure the communication interface 115 to transmit the additional data between the session for the image and the subsequent session for the subsequent image. For example, the communication interface controller 330 can cause communication interface 115 to transmit, to the HWD 150, timing information indicating the expected process end time $T_{EST}$. The timing information may be transmitted together with the image data in the session. After the session and before the expected process end time $T_{EST}$, the communication interface controller 330 may disable the communication interface 115. Similarly, after the session and before the expected time, the HWD 150 may disable its communication interface 165 in response to the timing information. At the expected time, the communication interface controller 330 can enable the communication interface 115, and the HWD 150 can enable the communication interface 165. When both communication interfaces 115, 165 are enabled, the communication interface controller 330 may configure the communication interface 115 to transmit the additional data to the HWD 150. After transmission of the additional data, the communication interface controller 330 may disable the communication interface 115, until the subsequent session for transmission of the subsequent image. Similarly, after transmission of the additional data, the HWD 150 may disable its communication interface 165, until the subsequent session for the subsequent image.

Figure 4:
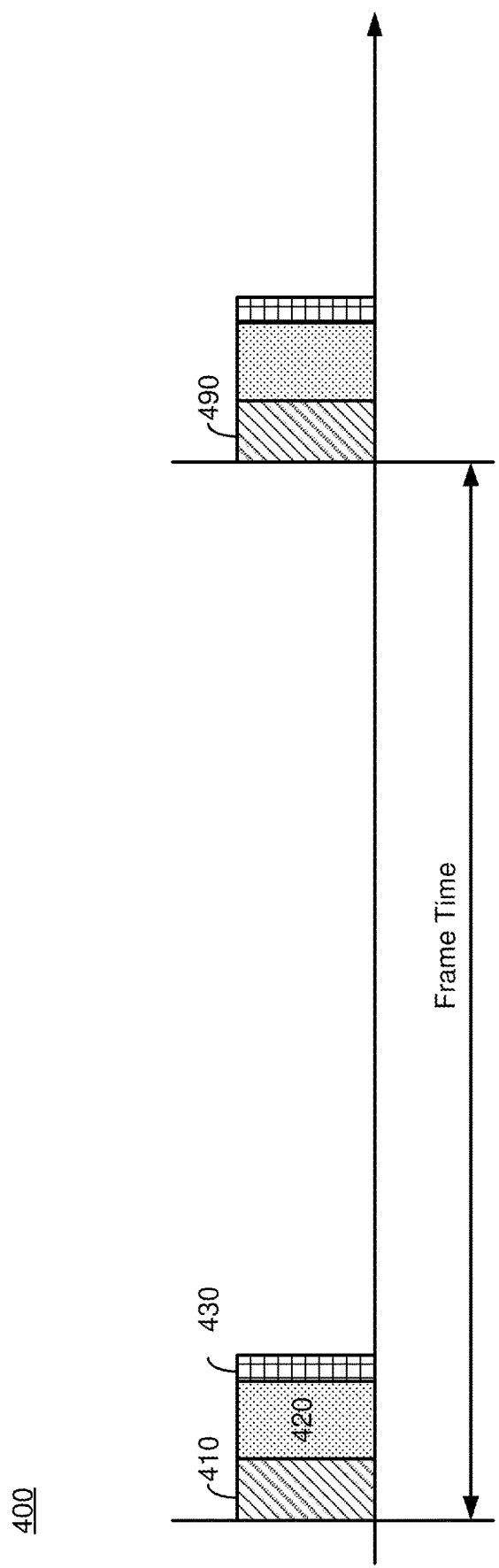
FIG. 4 is an example timing diagram of communication between a head wearable display and a console, according to an example implementation of the present disclosure.

FIG. 4 is an example timing diagram 400 of communication between a HWD 150 and a console 110, according to an example implementation of the present disclosure. In one example, the HWD 150 obtains in a session 410, sensor measurements indicating a location and/or an orientation of the HWD 150 in a physical space. The HWD 150 may also for instance generate or obtain hand tracking measurements indicating a location and/or an orientation of a hand of a user of the HWD 150 in the session 410. In a session 420 after the session 410, the HWD 150 may transmit the sensor measurements and the hand tracking measurements to the console 110 through a wireless link. In a session 430 after the session 420, the console 110 may generate image data and transmit the image data to the HWD 150 through the wireless link. In one example, the console 110 can divide an image into several portions, and can transmit image data for different portions in corresponding or different sessions.

In some cases, the console 110 may adaptively transmit the additional data to the HWD 150 as described above with respect to FIG. 4. For example, the console 110 may transmit the additional data with the image data in the session 430, if the session is capable or suitable for transmitting the additional data. If the session is incapable or unsuitable for transmitting the additional data, the console 110 may extend the session 430, select a subset of the additional data for transmission, or a combination of them. After the session 430, the console 110 and the HWD 150 may disable (e.g., pause, halt, refrain from) communication until a subsequent session 490 for the subsequent image. By disabling communication, power consumption of the console 110 and the HWD 150 can be reduced.

In some embodiments, the console 110 may transmit timing information indicating the expected process end time $T_{EST}$ to the HWD 150 causing the HWD 150 to configure its communication interface 165 in a sleep mode until the expected process end time $T_{EST}$ and wake up at the expected process end time $T_{EST}$ to receive the additional data. After receiving the additional data, the HWD 150 may configure its communication interface 165 in the sleep mode, until the subsequent session 490 for the subsequent image. Before the subsequent session 490, the HWD 150 may present the subsequent image of the artificial reality based on the image data and the additional data from the console 110. In some embodiments, the HWD 150 may perform reprojection and/or blending according to an updated measurements of the location and/or orientation of the HWD 150 to present the image corresponding to the updated location and/or orientation of the HWD 150 before the subsequent session 490.

Figure 5:
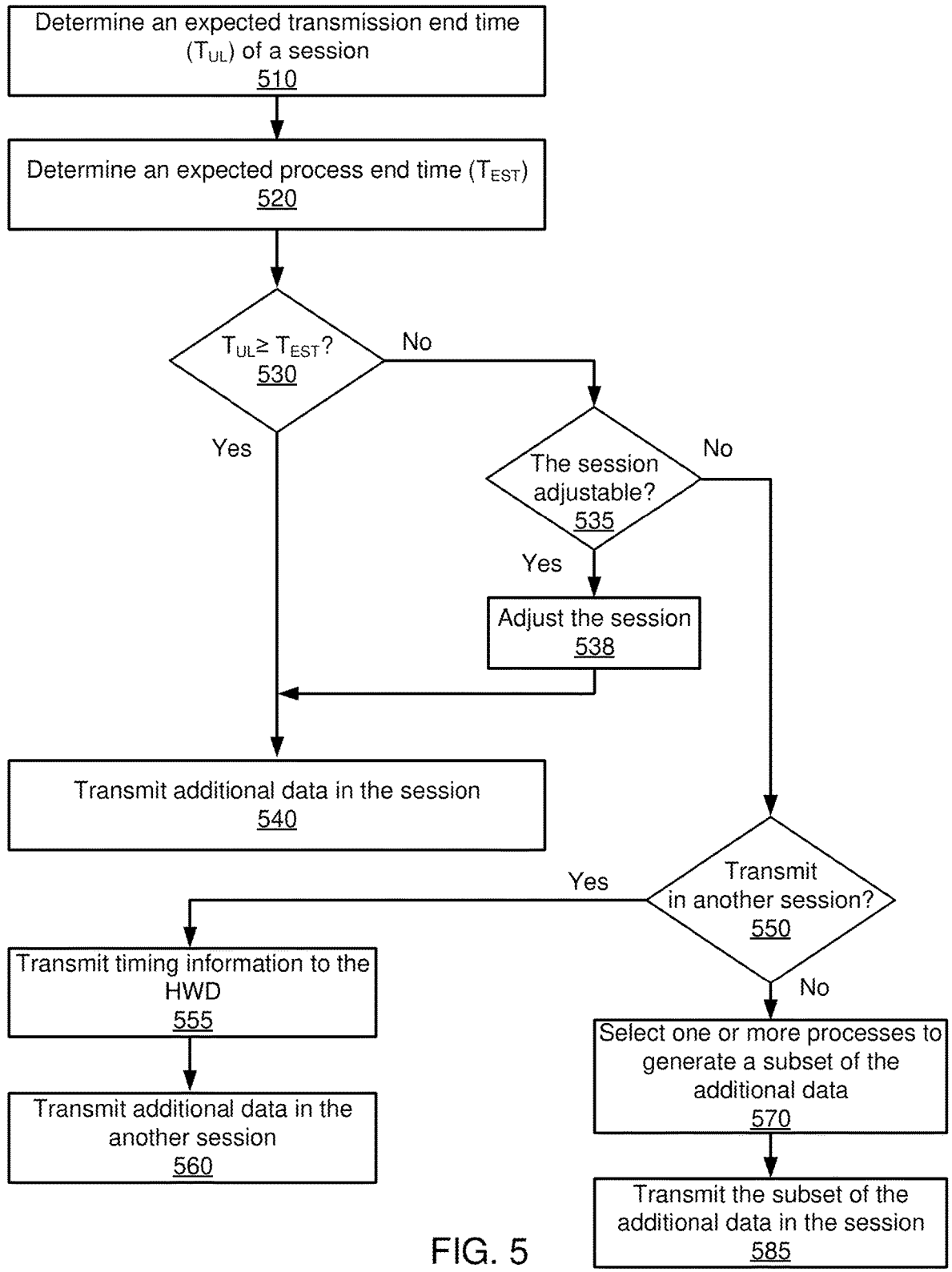
FIG. 5 shows an example process of a console transmitting image data and additional data to a head wearable display, according to an example implementation of the present disclosure.

FIG. 5 shows an example process 500 of a console 110 transmitting image data and additional data to a HWD 150, according to an example implementation of the present disclosure. In some embodiments, the process 500 includes more, fewer, or different steps than shown in FIG. 5. For example, in some embodiments, two or more of steps 538, 540, 555, 560, 570, 585 may be performed in any combination.

In one approach, the console 110 determines 510 an expected transmission end time ($T_{UL}$) to complete a session for wireless transmission of image data indicating an image of artificial reality to the HWD 150. The console 110 may determine the expected transmission end time $T_{UL}$ according to a size or an amount of the image data and a data rate of a wireless communication channel between the console 110 and the HWD 150. For example, the console 110 may divide the size or amount of the image data by the data rate to obtain, estimate or determine the expected transmission end time $T_{UL}$.

In one approach, the console 110 determines 520 an expected process end time ($T_{EST}$) for the console 110 to complete generating additional data associated with the image of the artificial reality. Additional data may be information (e.g., control information, timing information, configuration information, handshaking/acknowledgement information) associated with presenting or rendering artificial reality other than an image of the artificial reality. The console 110 may determine the expected process end time $T_{EST}$ according to a number of processes to generate the additional data, and a number of available processors or resources to execute the processes to generate the additional data. For example, the console 110 may determine an amount of time for the available processors to execute the processes to generate the additional data. In some embodiments, the console 110 determines the expected process end time $T_{EST}$, before executing processes for generating additional data, or during executing one or more processes for generating a portion of the additional data.

In one approach, the console 110 compares 530 the expected transmission end time $T_{UL}$ and the expected process end time $T_{EST}$ to determine whether the session for wireless transmission of the image data is capable or suitable for transmission of the additional data. If the expected transmission end time $T_{UL}$ is larger than or equal to the expected process end time $T_{EST}$, the console 110 may determine that the session is capable or suitable for transmission of the additional data. If the expected transmission end time $T_{UL}$ is less than the expected process end time $T_{EST}$, the console 110 may determine that the session is incapable or unsuitable for transmission of the additional data. In response to the session for wireless transmission of the image data being capable or suitable for transmission of the additional data (or the expected transmission end time $T_{UL}$ and the expected process end time $T_{EST}$), the console 110 may transmit the additional data together with (e.g., trailing or immediately after, piggybacking) the image data to the HWD 150 in the session. According to the image data and the additional data, the HWD 150 may present artificial reality to the user of the HWD 150.

In response to the session for wireless transmission of the image data being incapable or unsuitable for transmission of the additional data (or the expected transmission end time $T_{UL}$ being less than the expected process end time $T_{EST}$), the console 110 may determine 535 whether the session (and/or the corresponding uplink transmission time/duration) is adjustable. For example, the console 110 may determine whether the expected transmission end time $T_{UL}$ (and/or the corresponding the uplink transmission time/duration) can be extended to be equal to or larger than the expected process end time $T_{EST}$. If the session is adjustable, the console 110 may adjust 538 the session to increase the expected transmission end time $T_{UL}$ (and/or the corresponding the uplink transmission time/duration). For example, the console 110 may change MCS setting to lower a data rate of transmission from the console 110 to the HWD 150 to increase the expected transmission end time $T_{UL}$ (and/or the corresponding uplink transmission time/duration). After adjusting the session (and/or the corresponding uplink transmission time/duration), the console 110 may transmit 540 the additional data with the image data in the adjusted session.

If the session is not adjustable, the console 110 may determine 550 whether another session for additional data is available or not. The another session may be a temporary transmit session for the additional data. If the another session is available, the console 110 may transmit 555 timing information indicating the expected process end time $T_{EST}$ to the HWD 150, for example, in the session for the image data, and transmit 560 the additional data in the another session at or after the expected process end time $T_{EST}$. Between the session for the image data and the another session for the additional data, communication between the HWD 150 and the console 110 may be disabled to reduce power consumption. Moreover, after the transmission of the additional data in the another session, communication between the HWD 150 and the console 110 may be disabled until a subsequent session for subsequent image data.

If the another session for the additional data is not available, the console 110 may select 570 one or more processes to generate a subset of the additional data, and transmit 585 the subset of the additional data together with the image data to the HWD 150 in the session. In one aspect, the console 110 may select one or more processes to generate a subset of the additional data, according to priorities or rankings of different subsets of the additional data. In some embodiments, the console 110 adaptively determines a size or an amount of additional data that can be transmitted to the HWD 150 in the session with the image data, and determines a subset of the additional data having the determined size or the determined amount. The console 110 may perform the one or more processes to generate the selected subset of the additional data. The console 110 may omit or delay, for a later session, other processes to generate unselected subset of the additional data. The console 110 may transmit the selected subset of the additional data in the session together with the image data. In one example, the console 110 may select the SLAM data or the hand model data associated with image of the artificial reality over other data associated with the image. The console 110 may omit or bypass transmission of the other subset of the additional data.

Figure 6:
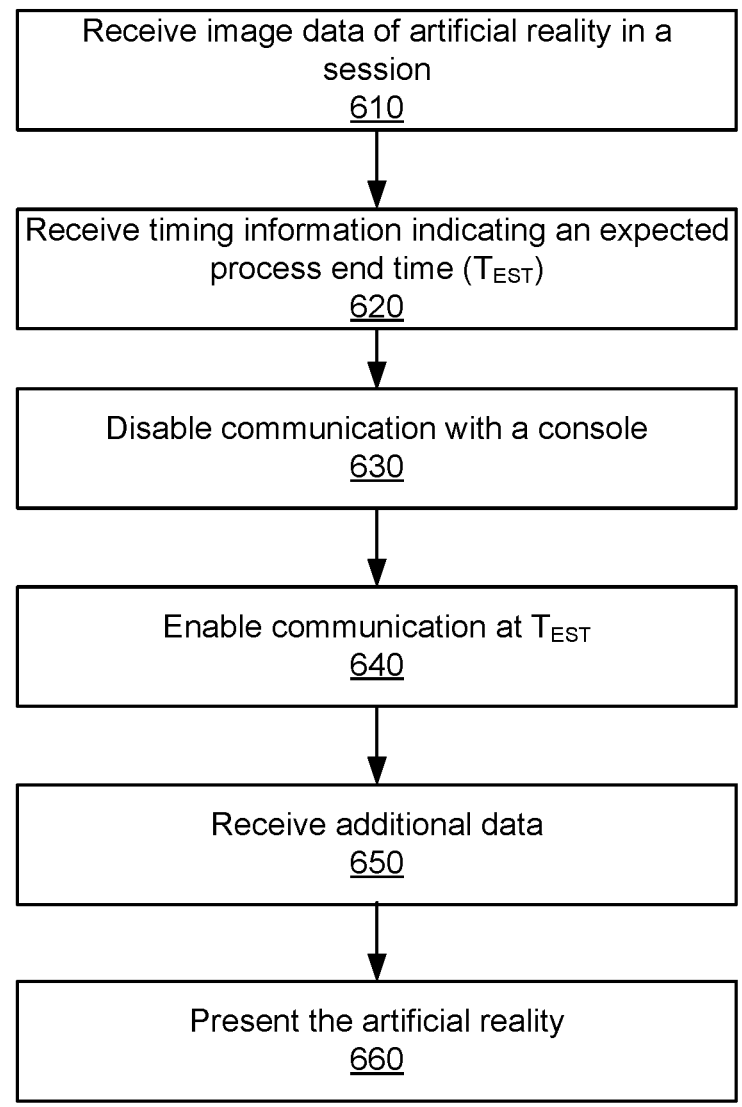
FIG. 6 shows an example process of a head wearable display receiving image data and additional data from a console, according to an example implementation of the present disclosure.

FIG. 6 shows an example process 600 of a HWD 150 receiving image data and additional data from a console 110, according to an example implementation of the present disclosure. In some embodiments, the process 600 includes more, fewer, or different steps than shown in FIG. 6.

In one approach, the HWD 150 receives 610 image data indicating an image of an artificial reality in a session through a wireless link from the console 110. In one approach, the HWD 150 receives 620 timing information indicating the expected process end time $T_{EST}$ from the console 110. The HWD 150 may receive the image data and the timing information in the session.

In one approach, the HWD 150 disables 630 communication with the console 110 after the session and before the expected process end time $T_{EST}$. At or after the expected process end time $T_{EST}$, the HWD 150 may enable 640 communication with the console 110, and receive 650 the additional data through the wireless link from the console 110. After receiving the additional data, the HWD 150 may disable the communication with the console 110 until a subsequent session for the subsequent image. According to the image data and the additional data, the HWD 150 may present 660 the artificial reality to the user of the HWD 150. Advantageously, additional data associated with the image data can be adaptively transmitted from the console 110 to the HWD 150, without delaying presentation of the artificial reality. Moreover, the HWD 150 can provide a seamless experience to the user, while reducing power consumption for the communication with the console 110.

Figure 7:
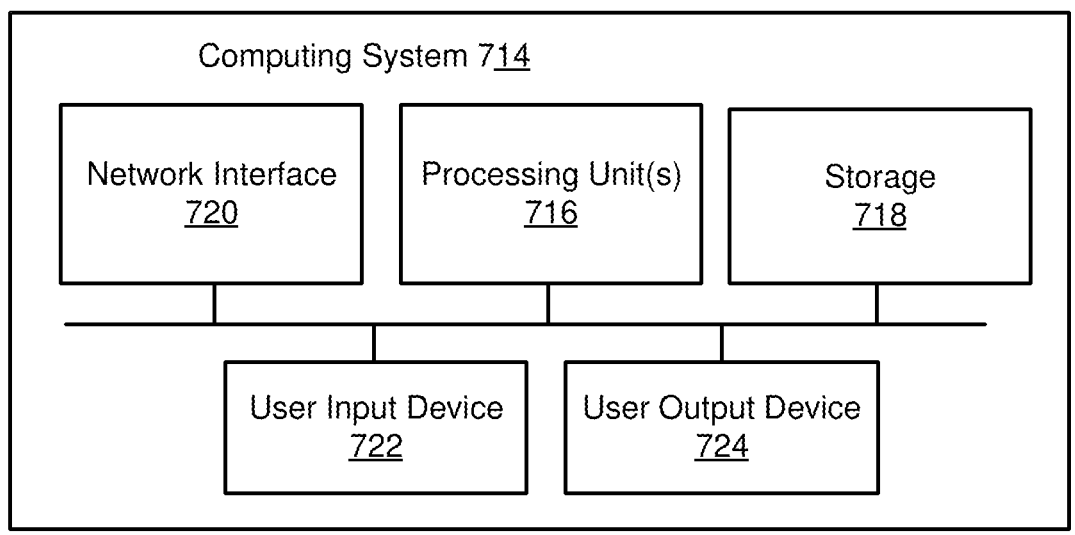
FIG. 7 is a block diagram of a computing environment according to an example implementation of the present disclosure.

Various operations described herein can be implemented on computer systems. FIG. 7 shows a block diagram of a representative computing system 714 usable to implement the present disclosure. In some embodiments, the console 110, the HWD 150 or both of FIG. 1 are implemented by the computing system 714. Computing system 714 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 714 can be implemented to provide VR, AR, MR experience. In some embodiments, the computing system 714 can include conventional computer components such as processors 716, storage device 718, network interface 720, user input device 722, and user output device 724. Network interface 720 can provide a connection to a wide area network (e.g., the Internet) to which WAN interface of a remote server system is also connected. Network interface 720 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 722 can include any device (or devices) via which a user can provide signals to computing system 714; computing system 714 can interpret the signals as indicative of particular user requests or information. User input device 722 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 724 can include any device via which computing system 714 can provide information to a user. For example, user output device 724 can include a display to display images generated by or delivered to computing system 714. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 724 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 716 can provide various functionality for computing system 714, including any of the functionality described herein as being performed by a server or client, or other functionality associated with message management services.

It will be appreciated that computing system 714 is illustrative and that variations and modifications are possible. Computer systems used in connection with the present disclosure can have other capabilities not specifically described here. Further, while computing system 714 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained.

Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
   determining, by a console, an expected transmission end time of a communication session for wireless transmission of image data of an image of an artificial reality to a wearable display;

determining, by the console, an expected process end time of generating additional data associated with the image of the artificial reality;
comparing, by the console, the expected transmission end time and the expected process end time;
adjusting, by the console, a modulation and coding scheme to extend the communication session, in response to the expected process end time being larger than the expected transmission end time; and
transmitting, by the console to the wearable display in the extended communication session, the additional data together with the image data.

2. The method of claim 1, further comprising:
receiving, by the console from the wearable display, information indicating a location and an orientation of the wearable display;
generating, by the console, the image data of the image of the artificial reality according to the received information; and
generating, by the console, the additional data associated with the image of the artificial reality.

3. The method of claim 1, further comprising:
transmitting, by the console to the wearable display in a same transmit opportunity window or system interval, the additional data together with the image data, if the expected process end time is less than the expected transmission end time.

4. The method of claim 1, wherein the additional data and the image data are transmitted in the extended communication session, if the expected process end time is less than another expected transmission end time of the extended communication session.

5. The method of claim 1, wherein the additional data includes:
mapping information for translating a location and an orientation of the wearable display in a physical space into a virtual space.

6. The method of claim 1, wherein the additional data includes:
hand model data indicating a shape, a location, or an orientation of a hand of a user of the wearable display.

7. The method of claim 1, wherein the additional data includes:
eye tracking data indicating a gaze direction of a user of the wearable display.

8. A system comprising:
a wireless communication interface; and
at least one processor configured to:
determine an expected transmission end time of a communication session for wireless transmission of image data of an image of an artificial reality to a wearable display,
determine an expected process end time of generating additional data associated with the image of the artificial reality,
compare the expected transmission end time and the expected process end time,
adjust a modulation and coding scheme to extend the communication session, in response to the expected process end time being larger than the expected transmission end time; and
cause the wireless communication interface to transmit, to the wearable display in the extended communication session, the additional data together with the image data.

9. The system of claim 8, wherein the at least one processor is further configured to:
configure the wireless communication interface to receive, from the wearable display, information indicating a location and an orientation of the wearable display;
generate the image data of the image of the artificial reality according to the received information; and
generate the additional data associated with the image of the artificial reality.

10. The system of claim 8, wherein the at least one processor is further configured to:
cause the wireless communication interface to transmit, to the wearable display in a same transmit opportunity window or system interval, the additional data together with the image data, if the expected process end time is less than the expected transmission end time.

11. The system of claim 8, wherein the at least one processor is configured to cause the wireless communication interface to transmit, to the wearable display in the extended communication session, the additional data together with the image data, if the expected process end time is less than another expected transmission end time of the extended communication session.

12. The system of claim 8, wherein the additional data includes:
mapping information for translating a location and an orientation of the wearable display in a physical space into a virtual space.

13. The system of claim 8, wherein the additional data includes:
hand model data indicating a shape, a location, or an orientation of a hand of a user of the wearable display.

14. The system of claim 8, wherein the additional data includes:
eye tracking data indicating a gaze direction of a user of the wearable display.

15. A non-transitory computer readable medium storing instructions when executed by one or more processors cause the one or more processors to:
determine an expected transmission end time of a communication session for wireless transmission of image data of an image of an artificial reality to a wearable display,
determine an expected process end time of generating additional data associated with the image of the artificial reality,
compare the expected transmission end time and the expected process end time,
adjust a modulation and coding scheme to extend the communication session, in response to the expected process end time being larger than the expected transmission end time; and
cause a wireless communication interface to transmit, to the wearable display in the extended communication session, the additional data together with the image data.

16. The non-transitory computer readable medium of claim 15, further storing instructions when executed by the one or more processors cause the one or more processors to:
cause the wireless communication interface to receive, from the wearable display, information indicating a location and an orientation of the wearable display;
generate the image data of the image of the artificial reality according to the received information; and
generate the additional data associated with the image of the artificial reality.

17. The non-transitory computer readable medium of claim 15, further storing instructions when executed by the one or more processors cause the one or more processors to:
   configure the wireless communication interface to transmit, to the wearable display in a same transmit opportunity window or system interval, the additional data together with the image data, if the expected process end time is less than the expected transmission end time.

18. The non-transitory computer readable medium of claim 15, wherein the wireless communication interface is configured to transmit, to the wearable display in the extended communication session, the additional data together with the image data, if the expected process end time is less than another expected transmission end time of the extended communication session.

19. The non-transitory computer readable medium of claim 15, wherein the additional data includes:
   mapping information for translating a location and an orientation of the wearable display in a physical space into a virtual space.

20. The non-transitory computer readable medium of claim 15, wherein the additional data includes:
   hand model data indicating a shape, a location, or an orientation of a hand of a user of the wearable display.

* * * * *